(12) United States Patent
Finley (10) Patent No.: US 8,393,112 B1
(45) Date of Patent: Mar. 12, 2013

(54) REMOVABLE TRIGGER MECHANISM FOR SPRING-BIASED FISH HOOK ASSEMBLY

(76) Inventor: James N. Finley, Lenoir, NC (US)

( * ) Notice: Subject to any disclaimer, the term of this patent is extended or adjusted under 35 U.S.C. 154(b) by 753 days.

(21) Appl. No.: 12/587,773

(22) Filed: Oct. 13, 2009

(51) Int. Cl.
A01K 83/00 (2006.01)

(52) U.S. Cl. .................................. 43/36; 43/34
(58) Field of Classification Search .............. 43/36, 34
See application file for complete search history.

(56) References Cited

U.S. PATENT DOCUMENTS

| 684,211 | A | * | 10/1901 | Ferch | 43/36 |
|---|---|---|---|---|---|
| 2,608,786 | A | * | 9/1952 | Schwartz | 43/36 |
| 2,722,078 | A | * | 11/1955 | Nikota | 43/36 |
| 2,856,722 | A | * | 10/1958 | Byhre | 43/36 |
| 2,971,285 | A | | 2/1961 | Murawski | |
| 2,982,047 | A | | 5/1961 | Wilshusen | |
| 4,054,004 | A | | 10/1977 | Schott | |
| 4,403,437 | A | | 9/1983 | Shuman | |
| 4,476,646 | A | | 10/1984 | Weiman | |
| 4,528,770 | A | | 7/1985 | McDiarmid | |
| 4,726,142 | A | * | 2/1988 | Tapley | 43/36 |
| 4,885,863 | A | | 12/1989 | Sprague | |
| 4,924,618 | A | | 5/1990 | McGahee | |
| 4,934,092 | A | | 6/1990 | Simmons et al. | |
| 4,947,574 | A | | 8/1990 | Tapley | |
| 5,269,089 | A | | 12/1993 | Gariglio | |
| 5,274,946 | A | | 1/1994 | Fusco | |
| 5,388,367 | A | | 2/1995 | Rydell | |
| 5,526,602 | A | | 6/1996 | Day, Sr. | |
| 5,890,314 | A | | 4/1999 | Peters | |
| 6,497,068 | B1 | | 12/2002 | Lemons | |
| 6,574,908 | B1 | | 6/2003 | Sanner | |
| 6,941,695 | B2 | | 9/2005 | Minegar | |
| 2002/0073599 | A1 | | 6/2002 | Brinkman | |

* cited by examiner

Primary Examiner — Christopher P Ellis
(74) Attorney, Agent, or Firm — Schwartz Law Firm, P.C.

(57) ABSTRACT

A removable trigger mechanism for a spring-biased hook assembly includes a generally U-shaped swivel attachment portion having first and second spaced apart resilient surfaces cooperating to frictionally engage a first biasing element of the hook assembly. A hook-setting finger is formed adjacent the first resilient surface of the swivel attachment portion, and is adapted for temporarily holding a second biasing element of the hook assembly when in a loaded condition. An actuation lever is formed adjacent the second resilient surface of the swivel attachment portion, and is adapted for pivoting the attachment portion relative to the first biasing element of the hook assembly. When pivoted, the actuation lever simultaneously moves the hook-setting finger away from the second biasing element of the hook assembly in the loaded condition, such that the hook assembly is released for sudden movement from the loaded condition to an outwardly-flared deployed condition.

20 Claims, 6 Drawing Sheets

REMOVABLE TRIGGER MECHANISM FOR SPRING-BIASED FISH HOOK ASSEMBLY

TECHNICAL FIELD AND BACKGROUND

The present disclosure relates broadly the recreational fishing industry, and more particularly to artificial and natural fishing lures and components adapted for use combination with such lures. In terms of recreational fishing, a lure is an object attached to the end of fishing line and designed to resemble and move like an item of fish prey. The basic purpose of the lure is to use movement, vibrations, and/or color to catch the fish's attention and to entice the fish to "bite" the hook. Conventional lures may be equipped with one or more exposed single, double, or treble hooks. Such lures are generally used with a fishing rod and fishing reel. When a lure is used for casting, it is continually cast out and retrieved—the retrieval making the lure "swim" through the water.

The concept of the present disclosure may be incorporated in many different types of fishing lures. For example, the present lure may comprise or incorporate a jig, spoon, plug (or crankbait), artificial fly, bass worm, spinnerbait, or the like. Additionally, multiple lures of the present disclosure may be used on a single line, as in the manner of a trotline.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

According to one exemplary embodiment, the present disclosure comprises a removable trigger mechanism for a spring-biased hook assembly. The trigger mechanism includes a generally U-shaped swivel attachment portion comprising first and second spaced apart resilient surfaces cooperating to frictionally engage a first biasing element of the hook assembly. A hook-setting finger is formed adjacent the first resilient surface of the swivel attachment portion, and is adapted for temporarily holding a second biasing element of the hook assembly when in a loaded condition. An actuation lever is formed adjacent the second resilient surface of the swivel attachment portion, and is adapted for pivoting the attachment portion relative to the first biasing element of the hook assembly. When pivoted, the actuation lever simultaneously moves the hook-setting finger away from the second biasing element of the hook assembly in the loaded condition, such that the hook assembly is released for sudden movement from the loaded condition to an outwardly-flared deployed condition.

According to another exemplary embodiment, the swivel attachment portion, hook-setting finger, and actuation lever are integrally formed together. The terms "integrally formed", "integrally joined", "integrally connected" (and the like) may be used interchangeably herein, and refer to separate elements which are formed together as a single homogenous unit or assembly. For example, two halves of a single folded metal wire may be considered integrally formed together.

According to another exemplary embodiment, the actuation lever comprises a substantially arcuate extension.

According to another exemplary embodiment, the actuation lever has a width dimension and a thickness, the width dimension being substantially greater than the thickness.

According to another exemplary embodiment, the hook-setting finger defines an elongated groove designed to receive and temporarily hold the second biasing element of the hook assembly when in the loaded condition.

According to another exemplary embodiment, the swivel attachment portion and the hook-setting finger are integrally formed together in a substantially S-shaped configuration.

In yet another exemplary embodiment, the disclosure comprises a spring-biased hook assembly having first and second biasing elements, and a removable trigger mechanism.

According to another exemplary embodiment, at least one of the first and second biasing elements of the hook assembly comprises an elongated shank with an integrally formed bend and point. Alternatively, one or more of the shank, bend and point may be separately formed.

According to another exemplary embodiment, the first and second biasing elements of the hook assembly comprise respective first and second metal hooks. Each hook comprises an elongated shank, bend and point; the elongated shanks of the hook assembly being integrally-formed together at their respective proximal ends. Alternatively, the first and second biasing elements may be mechanically attached together at their respective proximal ends.

In yet another exemplary embodiment, the disclosure comprises a fishing lure incorporating a spring-biased hook assembly and a removable trigger mechanism. The term "lure" is defined broadly herein to mean any device used alone, or in combination with other devices, elements, or structure, for purposes of attracting and/or catching fish.

BRIEF DESCRIPTION OF THE DRAWINGS

The description of exemplary embodiments proceeds in conjunction with the following drawings, in which.

DESCRIPTION OF EXEMPLARY EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figures 1, 1A:
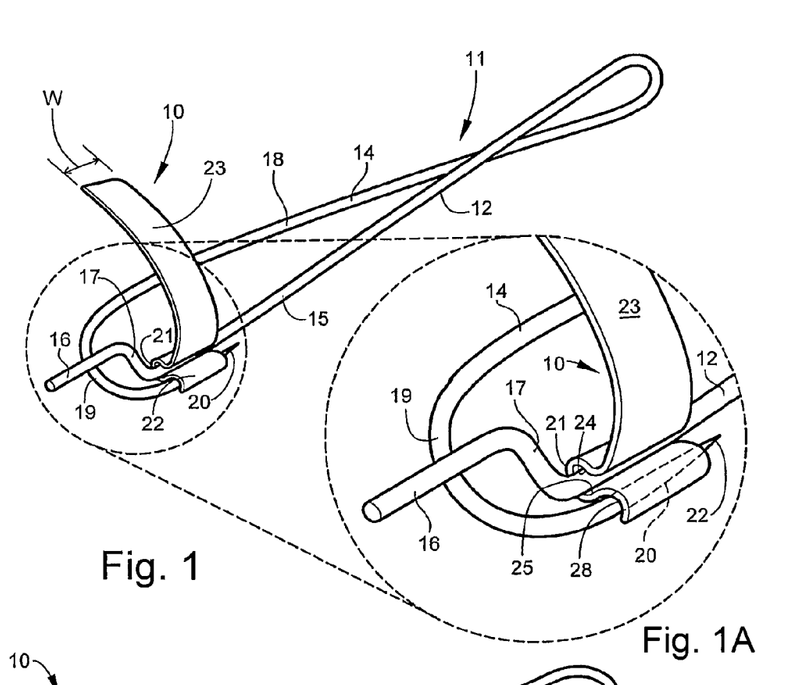
FIG. 1 is a perspective view of spring-biased hook assembly incorporating a snap-on trigger mechanism according to one exemplary embodiment of the present disclosure.
FIG. 1A is an enlarged fragmentary view of the trigger mechanism and hook assembly shown in FIG. 1.
Figure 2:
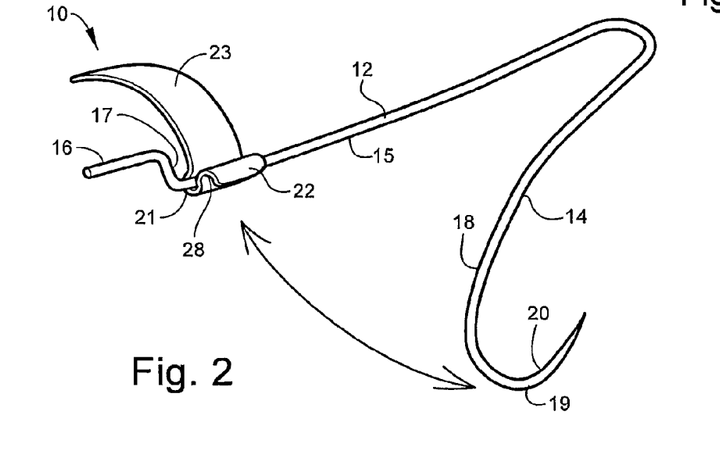
FIG. 2 is a perspective view of the trigger mechanism when released, and showing the hook assembly in the outwardly-flared deployed condition.

Referring now specifically to the drawings, a removable trigger mechanism for an artificial fishing lure according to one exemplary embodiment of the present invention is illustrated in FIG. 1, and shown generally at reference numeral 10. The exemplary trigger mechanism 10 is designed for snap-on, retrofit attachment to a spring-biased hook assembly 11, such as that used in the recreational fishing industry. In the embodiment of FIGS. 1-4, the hook assembly 11 comprises first and second cooperating biasing elements 12, 14 integrally-formed together at their respective proximal ends. The first biasing element 12 comprises an elongated metal shank 15 having a substantially straight free end 16 and an integrally-formed intermediate jog 17. The second biasing element 14 comprises an elongated metal shank 18 which extends into an integrally-formed bend 19 and point 20 at its free end. The jog 17 of biasing element 12 may function to properly locate and align the trigger mechanism 10 relative to the point 20 of biasing element 14, as discussed below, while the straight free end 16 may be used to help set the hook assembly 11 and facilitate attachment of optional lure parts (e.g., rubber worm, spinner blades, and the like). The first and second biasing elements 12, 14 are normally arranged in an outwardly flared (or "deployed") condition, such as shown in FIG. 2. The trigger mechanism 10 functions, as described below, to release the hook assembly 11 from a loaded condition shown in FIG. 1 to the deployed of FIG. 2.

Figures 3, 4:
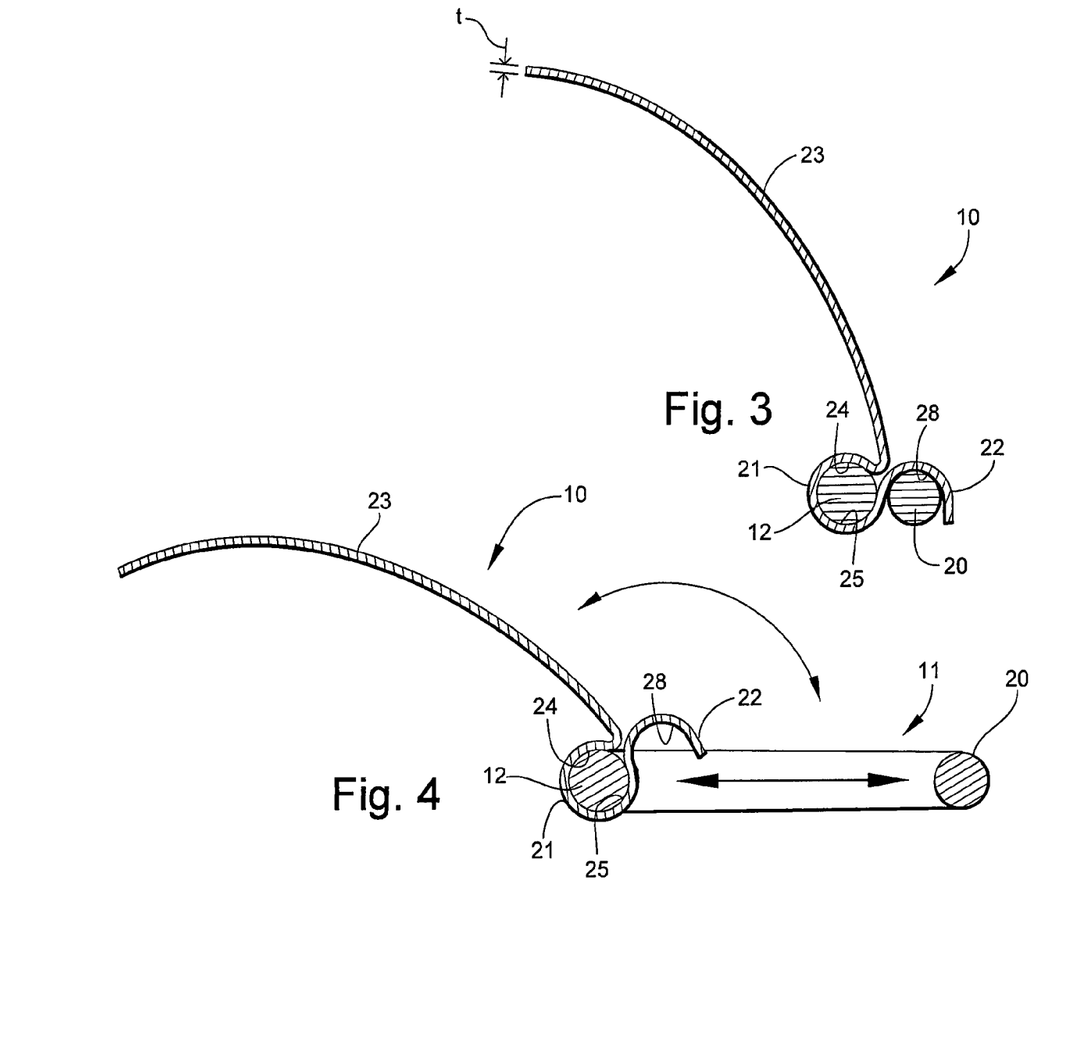
FIG. 3 is a cross-sectional view of the trigger mechanism and hook assembly in the loaded condition.
FIG. 4 is a further cross-sectional view of the trigger mechanism and hook assembly immediately after the trigger mechanism is actuated and the hook assembly released to the deployed condition.

As best shown in FIGS. 1A, 3 and 4, the exemplary trigger mechanism 10 comprises a generally U-shaped snap-on swivel attachment portion 21, a hook-setting finger 22, and an actuation lever 23. The swivel attachment portion 21 includes first and second spaced apart resilient surfaces 24, 25 which cooperate to substantially surround and frictionally engage the first biasing element 12 of the hook assembly 11. The hook-setting finger 22 is formed adjacent the first resilient surface 24 of the swivel attachment portion 21, and serves to temporarily engage and hold the second biasing element 14 of the hook assembly 11 when in the loaded condition. In the exemplary embodiment, the hook-setting finger 22 defines an elongated groove 28 contoured to receive the point 20 of the biasing element 14, as shown in FIG. 3, and is integrally-formed together with the swivel attachment portion 21 in a substantially S-shaped configuration. When loaded, the trigger mechanism 10 may further serve as a weed guard to help shield the point 20 of the biasing element 14 as the hook assembly 11 is drawn through the water.

The actuation lever 23 of the trigger mechanism 10 is formed adjacent the second resilient surface 25 of the swivel attachment portion 21, and comprises a substantially arcuate extension shaped to readily enter a mouth of the fish. The actuation lever 23 may have a width dimension "w" substantially greater than its thickness "t", and a bend radius "r" in the range of 0.5 to 2.0 inches. When inside the mouth of the fish, the actuation lever 23 is engaged and pressed towards the hook assembly 11 thereby causing the attachment portion 21 of the trigger mechanism 10 to simultaneously swivel about the shank 15 of biasing element 12. Swivel movement of the attachment portion 21 causes simultaneous pivoting of the hook-setting finger 22 away from the second biasing element 14 of the hook assembly 11. As demonstrated in FIGS. 2 and 4, when the second biasing element 14 is released, the hook assembly 11 "fires" causing rapid movement of the biasing elements 12, 14 from the spring-loaded condition to the deployed condition, thereby piercing the point 20 of biasing element 14 into and through the mouth of the fish.

Figures 5, 5A:
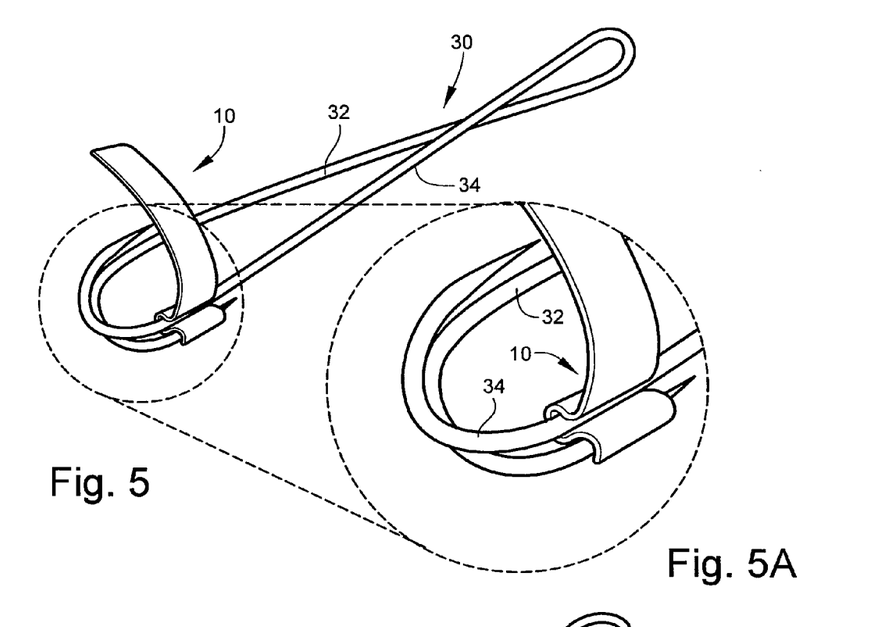
FIG. 5 is a perspective view of a double-hook assembly incorporating the exemplary snap-on trigger mechanism according to the present disclosure.
FIG. 5A is an enlarged fragmentary view of the trigger mechanism and hook assembly shown in FIG. 5.
Figure 6:
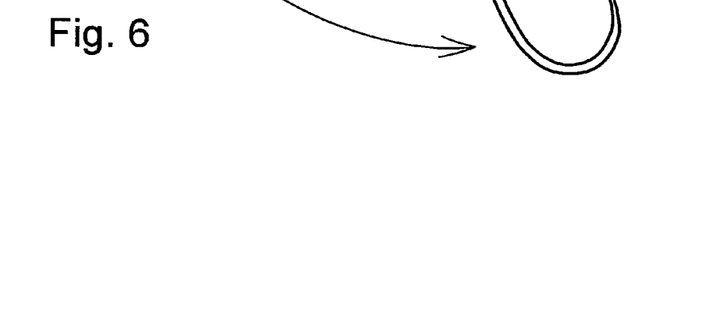
FIG. 6 is a perspective view of the trigger mechanism when released, and showing the double-hook assembly in the outwardly-flared deployed condition.

Use of the trigger mechanism 10 on an alternative embodiment of a spring-biased hook assembly 30 is illustrated in FIGS. 5, 5A, and 6. In this embodiment, the exemplary hook assembly 30 incorporates first and second cooperating biasing elements 32, 34; each biasing element comprising an elongated metal shank, bend, and point. The metal shanks are integrally joined together at their proximal ends (e.g., by bending) while the hook bends are oppositely directed and normally biased in an outwardly flared (or "deployed") condition, such as shown in FIG. 6. The trigger mechanism 10 functions (identically as described above) to release the double-hook assembly 30 from a loaded condition shown in FIG. 5 to the deployed condition of FIG. 6.

Figure 7:
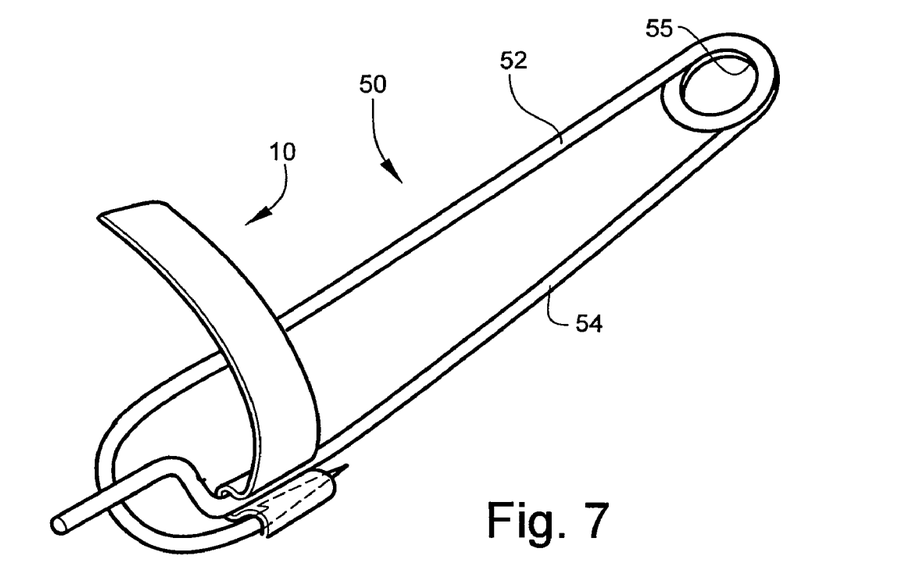
FIG. 7 is a perspective view of a further exemplary spring-biased hook assembly incorporating a snap-on trigger mechanism according to the present disclosure.
Figure 8:
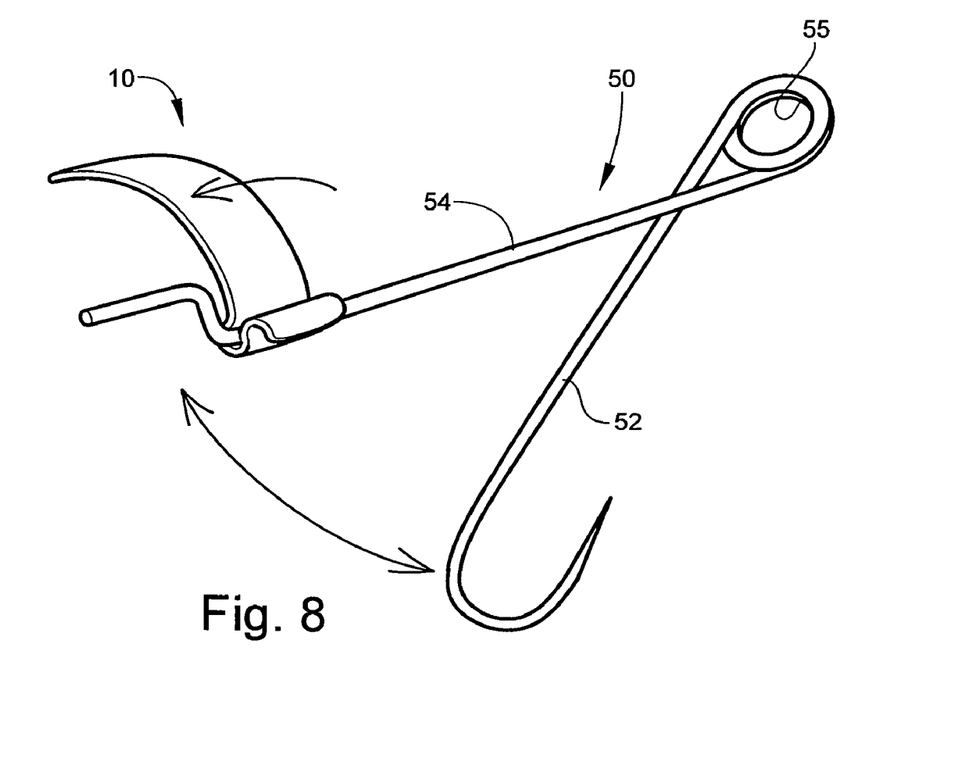
FIG. 8 is a perspective view showing the trigger mechanism released and the spring-biased hook assembly of FIG. 7 in the deployed condition.
Figure 9:
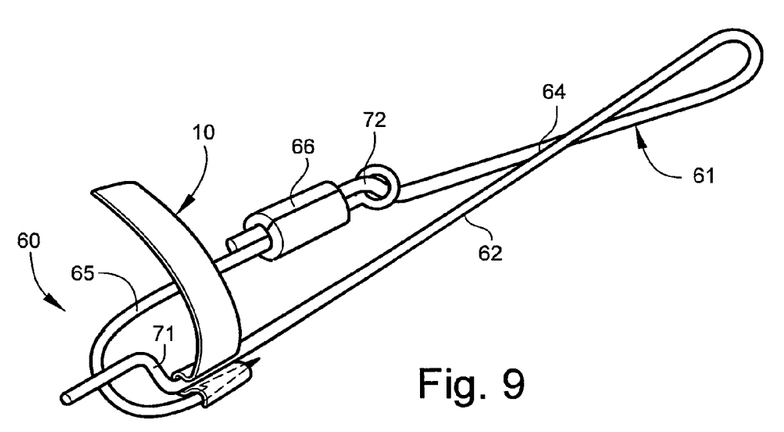
FIG. 9 is a perspective view of yet another exemplary spring-biased hook assembly incorporating a snap-on trigger mechanism according to the present disclosure.
Figure 10:
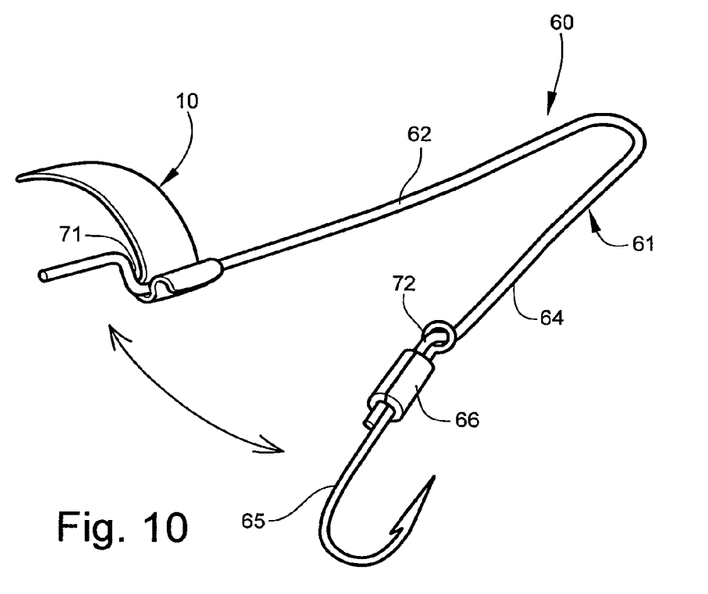
FIG. 10 is a perspective view showing the trigger mechanism released and the spring-biased hook assembly of FIG. 9 in the deployed condition.

A further alternative embodiment of the disclosure is shown in FIGS. 7 and 8. In this embodiment, the trigger mechanism 10 is used in combination with a hook assembly 50 comprising first and second cooperating biasing elements 52, 54. Unlike hook assembly 11, the elongated shanks of biasing elements 52, 54 are integrally joined together at their respective proximal ends in the form of an eyelet 55 adapted for receiving and attaching a fishing line. The remaining structure and features of biasing elements 52, 54 are identical to elements 12, 14. As described above, the trigger mechanism 10 functions to release the hook assembly 50 from a loaded condition shown in FIG. 7 to the deployed condition of FIG. 8.

FIGS. 9, 10, 11A, 11B, and 11C, illustrate yet another exemplary embodiment of a spring-biased hook assembly 60 according to the present disclosure. This embodiment incorporates a metal wire spring 61 comprising first and second cooperating biasing elements 62, 64, a conventional fish hook 65, and attachment collar 66. The hook assembly 60 may be used in combination with a trigger mechanism 10 identical to that described above. The biasing elements 62, 64 are integrally formed together at their proximal ends, and include respective locating jogs 71, 72 for properly attaching and aligning the hook 65 and trigger mechanism 10. As previously described, the trigger mechanism 10 functions to release the hook assembly 60 from a loaded condition shown in FIG. 9 to the deployed condition of FIG. 10.

Figures 11A, 11B, 11C:
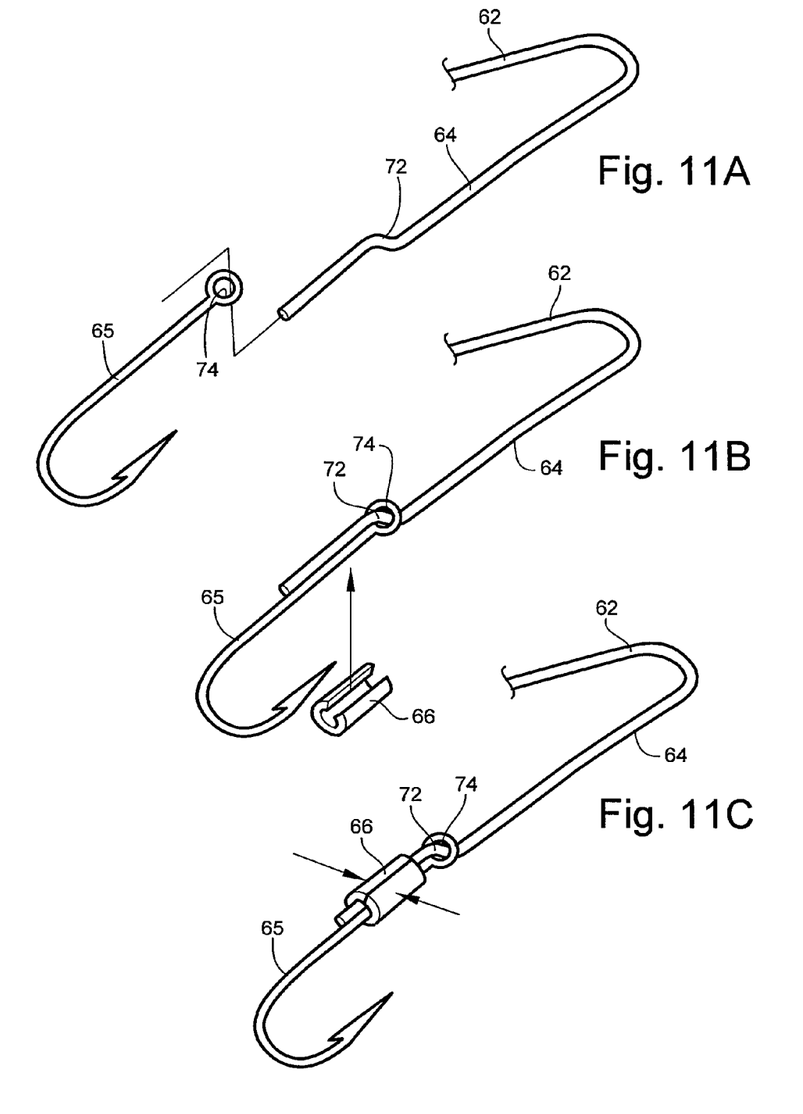
FIGS. 11A, 11B, and 11C are sequential views demonstrating one method of assembling the spring-biased hook assembly of FIG. 9.

Referring to FIGS. 11A, 11B, and 11C, the hook assembly 60 is assembled by first inserting a free end of biasing element 64 through the eyelet 74 of the fish hook 65 as indicated in FIG. 11A. The hook 65 is then positioned adjacent the locating jog 72, as demonstrated in FIG. 11B, and the free end of biasing element 64. The attachment collar 66 is then applied to both the hook 65 and biasing element 64, as demonstrated in FIG. 11C, and press-fit using (e.g.) plyers or other suitable tool.

In any one or more of the embodiments discussed above, the actuation lever of the trigger mechanism may be used to attach bait or other lure parts to the combination. Additionally, the exemplary snap-on trigger mechanism may be combined with other various spring-biased hook assemblies, and may be used together with any other desired lure or lure parts.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

I claim:

1. A removable trigger mechanism for a spring-biased hook assembly comprising first and second elongated biasing elements, said trigger mechanism comprising:
    a generally U-shaped swivel attachment portion comprising first and second spaced apart resilient surfaces cooperating to frictionally snap-attach said trigger mechanism to the first biasing element of the hook assembly;
    a hook-setting finger formed adjacent the first resilient surface of said swivel attachment portion, and adapted for temporarily holding the second biasing element of the hook assembly when in a loaded condition; and
    an actuation lever formed adjacent the second resilient surface of said swivel attachment portion, and adapted for pivoting said attachment portion relative to the first biasing element of the hook assembly, thereby simultaneously moving said hook-setting finger away from the second biasing element of the hook assembly in the loaded condition, such that the hook assembly is released for sudden movement from the loaded condition to an outwardly-flared deployed condition.

2. A removable trigger mechanism according to claim 1, wherein said swivel attachment portion, hook-setting finger, and actuation lever are integrally formed together as a single homogenous unit.

3. A removable trigger mechanism according to claim 1, wherein said actuation lever comprises a substantially arcuate extension.

4. A removable trigger mechanism according to claim 3, wherein said actuation lever has a width dimension and a thickness, the width dimension being substantially greater than the thickness.

5. A removable trigger mechanism according to claim 1, wherein said hook-setting finger defines an elongated groove designed to receive and temporarily hold the second biasing element of the hook assembly when in the loaded condition.

6. A removable trigger mechanism according to claim 1, wherein said swivel attachment portion and said hook-setting finger are integrally formed together in a substantially S-shaped configuration.

7. A removable trigger mechanism for a spring-biased hook assembly comprising first and second elongated biasing elements, said trigger mechanism consisting of:
    a generally U-shaped swivel attachment portion comprising first and second spaced apart resilient surfaces cooperating to frictionally snap-attach said trigger mechanism to the first biasing element of the hook assembly;
    a hook-setting finger formed adjacent the first resilient surface of said swivel attachment portion, and adapted for temporarily holding a second biasing element of the hook assembly when in a loaded condition; and
    an actuation lever formed adjacent the second resilient surface of said swivel attachment portion, and adapted for pivoting said attachment portion relative to the first biasing element of the hook assembly, thereby simultaneously moving said hook-setting finger away from the second biasing element of the hook assembly in the loaded condition, such that the hook assembly is released for sudden movement from the loaded condition to an outwardly-flared deployed condition.

8. A removable trigger mechanism according to claim 7, wherein said swivel attachment portion, hook-setting finger, and actuation lever are integrally formed together as a single homogenous unit.

9. A removable trigger mechanism according to claim 7, wherein said actuation lever comprises a substantially arcuate extension.

10. A removable trigger mechanism according to claim 9, wherein said actuation lever has a width dimension and a thickness, the width dimension being substantially greater than the thickness.

11. A removable trigger mechanism according to claim 7, wherein said hook-setting finger defines an elongated groove designed to receive and temporarily hold the second biasing element of the hook assembly when in the loaded condition.

12. A removable trigger mechanism according to claim 7, wherein said swivel attachment portion and said hook-setting finger are integrally formed together in a substantially S-shaped configuration.

13. A spring-biased hook assembly comprising first and second cooperating biasing elements, and a removable trigger mechanism, said trigger mechanism comprising:
a generally U-shaped swivel attachment portion comprising first and second spaced apart resilient surfaces cooperating to frictionally snap-attach said trigger mechanism to the first biasing element of said hook assembly;
a hook-setting finger formed adjacent the first resilient surface of said swivel attachment portion, and adapted for temporarily holding the second biasing element of said hook assembly when in a loaded condition; and
an actuation lever formed adjacent the second resilient surface of said swivel attachment portion, and adapted for pivoting said attachment portion relative to the first biasing element of said hook assembly, thereby simultaneously moving said hook-setting finger away from the second biasing element of said hook assembly in the loaded condition, such that said hook assembly is released for sudden movement from the loaded condition to an outwardly-flared deployed condition.

14. A spring-biased hook assembly according to claim 13, wherein at least one of said first and second biasing elements comprises an integrally-formed elongated shank, bend, and point.

15. A spring-biased hook assembly according to claim 13, wherein said first and second biasing elements comprise respective elongated shanks with oppositely directed bends and points.

16. A spring-biased hook assembly according to claim 13, wherein said swivel attachment portion, hook-setting finger, and actuation lever are integrally formed together as a single homogenous unit.

17. A spring-biased hook assembly according to claim 13, wherein said actuation lever comprises a substantially arcuate extension.

18. A spring-biased hook assembly according to claim 17, wherein said actuation lever has a width dimension and a thickness, the width dimension being substantially greater than the thickness.

19. A spring-biased hook assembly according to claim 13, wherein said hook-setting finger defines an elongated groove designed to receive and temporarily hold the second biasing element of said hook assembly when in the loaded condition.

20. A spring-biased hook assembly according to claim 13, wherein said swivel attachment portion and said hook-setting finger are integrally formed together in a substantially S-shaped configuration.

* * * * *